United States Patent
Cassarly

(10) Patent No.: US 7,277,609 B2
(45) Date of Patent: Oct. 2, 2007

(54) METHODS FOR MANIPULATING LIGHT EXTRACTION FROM A LIGHT GUIDE

(75) Inventor: William J. Cassarly, Mason, OH (US)

(73) Assignee: Optical Research Associates, Pasadena, CA (US)

( * ) Notice: Subject to any disclaimer, the term of this patent is extended or adjusted under 35 U.S.C. 154(b) by 0 days.

(21) Appl. No.: 11/267,945

(22) Filed: Nov. 4, 2005

(65) Prior Publication Data
US 2006/0115214 A1    Jun. 1, 2006

Related U.S. Application Data

(60) Provisional application No. 60/625,646, filed on Nov. 5, 2004.

(51) Int. Cl.
*G02B 6/42* (2006.01)
*F21V 7/04* (2006.01)

(52) U.S. Cl. .......................... 385/31; 362/559; 362/615

(58) Field of Classification Search ..................... None
See application file for complete search history.

(56) References Cited

U.S. PATENT DOCUMENTS

| | | | |
|---|---|---|---|
| 6,502,946 B1 | 1/2003 | Fujino et al. | |
| 6,776,494 B2 | 8/2004 | Fujino et al. | |
| 2006/0062540 A1* | 3/2006 | Zoorob et al. | ............... 385/147 |

OTHER PUBLICATIONS

N. Shatz, J. Bortz, and M.S. Dassanayake "Design optimization of a smooth headlamp reflector to SAE/DOT beam-shape requirements", *SPIE proc.* vol. 3781, pp. 135-154, 1999.

M. Sikkens and P. Nuyens, "Structure design method of automotive lamp reflectors", *SPIE proc.* vol. 5173, pp. 46-54, 2003.

W.J. Cassarly and M.J. Hayford, "Illumination optimization: The revolution has begun", *SPIE proc.* vol. 4832, pp. 258-269, IODC 2002.

T.L.R. Davenport, T.A. Hough, W.J. Cassarly, "Optimization for illumination systems: the next level of design", *SPIE proc.* vol. 5456, pp. 81-90, Sep. 2004.

\* cited by examiner

*Primary Examiner*—Sung Pak
*Assistant Examiner*—Tina M. Wong
(74) *Attorney, Agent, or Firm*—Knobbe, Martens, Olson & Bear LLP

(57) ABSTRACT

In one embodiment, a method of defining an array of extractor elements configured to extract light from a light guide, and thereby produce a desired spatial light pattern $E_T$ quantifying optical output at a plurality of locations across the light guide is provided. The method comprises calculating a first spatial light pattern produced by a first array of extractor elements. The first spatial light pattern quantifies optical output at the plurality of locations across the light guide. The method further comprises determining a ratio R of the optical output of the desired spatial light pattern to an optical output of the first spatial light pattern. The method further comprises determining a modified ratio R', wherein $R'=R^{\alpha}$ and $|\alpha|<1$. The method further comprises determining a characteristic of a second array of extractor elements by scaling a characteristic of the first array of extractor elements by the modified ratio R'.

27 Claims, 14 Drawing Sheets

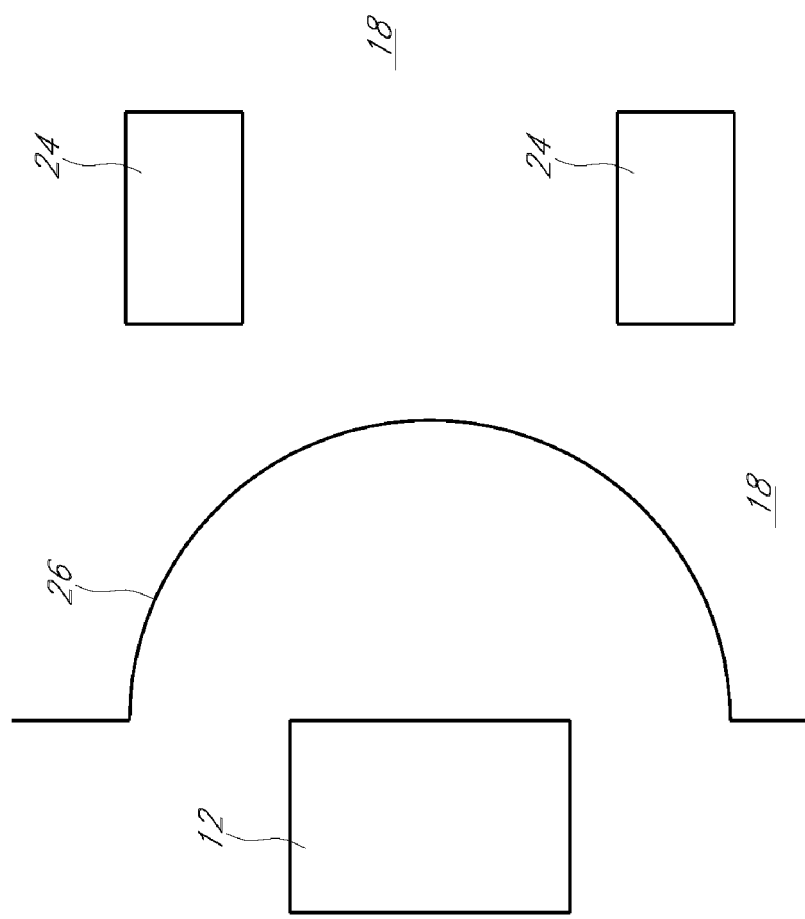

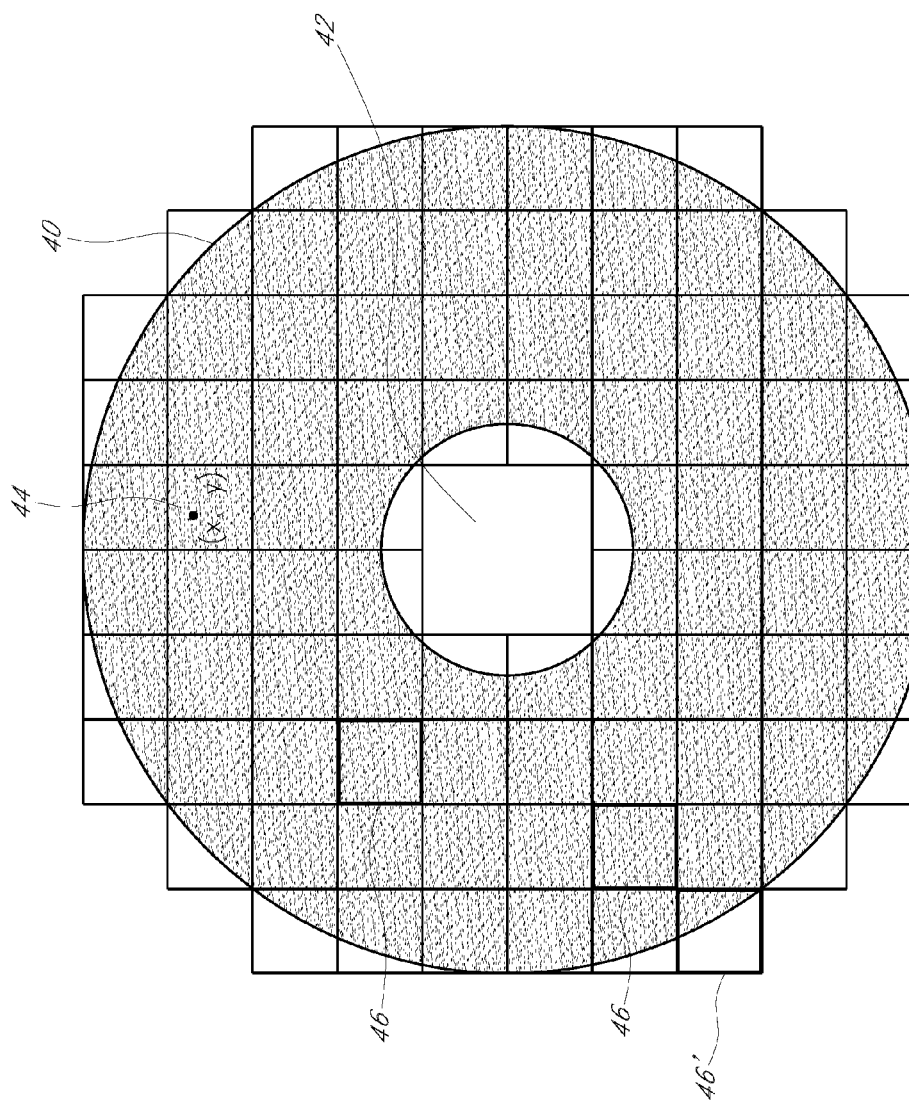

METHODS FOR MANIPULATING LIGHT EXTRACTION FROM A LIGHT GUIDE

CROSS-REFERENCE TO RELATED APPLICATIONS

This application claims the benefit of U.S. Provisional Patent Application 60/625,646, filed 5 Nov. 2004, the entire disclosure of which is hereby incorporated by reference herein.

FIELD OF THE INVENTION

This application relates generally to methods for manipulating the extraction of light from a light guide, and relates more specifically to methods for adjusting the spatial distribution of light extracted from a light guide.

BACKGROUND

Light guides are used in a wide variety of applications to transmit light from one location to another. Light guides having a variety of different geometries have been developed for different applications. For example, a light guide configuration that is particularly useful in display applications is a planar light guide. In a typical display configuration, a light source is positioned along an edge of a planar light guide that is configured to receive light generated by the light source. The light propagates within the light guide by total internal reflection, and is extracted from one of the planar surfaces of the light guide. The extracted light, which is usable to illuminate a display field, is optionally passed through subsequent optical components, such as diffusers, light recycling films, and/or spatial modulators.

Light is extracted from a planar surface of the light guide using one or more of a wide variety of extraction elements. Generally, the extraction elements comprise a feature that causes light to propagate out of the light guide instead of being totally internally reflected within the light guide. Typical extraction elements comprise, for example, raised or recessed surface features such as protrusions or dimples, as well as localized material differences or other surface or volume perturbations in the light guide. Often the extraction elements are arranged to extract a substantially uniform light field from the light guide, which is particularly advantageous in the context of providing a uniform illumination field for a display surface.

When light is extracted from a planar light guide, nonuniformities in the illumination of the light guide are manifested in a nonuniform illumination field extracted from the light guide. In the context of a planar light guide used to illuminate a display field, such nonuniformities are manifested as brightly illuminated regions and poorly illuminated regions of the display field. A more uniform illumination can be produced by modifying the spatial distribution of extraction elements on the light guide, such that more light is extracted from the light guide in poorly-illuminated regions, and less light is extracted from the light guide in well-illuminated regions. While this approach is usable to provide a more uniform field of light extracted from the light guide, it fails to provide a generalized approach for producing a desired illumination field, such as a spatially nonuniform illumination field.

SUMMARY

In various embodiments described herein generalized methods for adjusting the spatial distribution of light extracted from a light guide can be used for obtaining uniform or nonuniform illumination fields.

In one embodiment, a method of defining an array of extractor elements configured to extract light from a light guide, and thereby produce a desired spatial light pattern $E_T$ quantifying optical output at a plurality of locations across the light guide is provided. The method comprises calculating a first spatial light pattern produced by a first array of extractor elements. The first spatial light pattern quantifies optical output at the plurality of locations across the light guide. The method further comprises determining a ratio R of the optical output of the desired spatial light pattern to an optical output of the first spatial light pattern. The method further comprises determining a modified ratio R', wherein $R'=R^\alpha$ and $|\alpha|<1$. The method further comprises determining a characteristic of a second array of extractor elements by scaling a characteristic of the first array of extractor elements by the modified ratio R'.

BRIEF DESCRIPTION OF THE DRAWINGS

Exemplary embodiments of the methods, extraction element configurations, and results disclosed herein are illustrated in the accompanying drawings, which are for illustrative purposes only. The drawings comprise the following figures, in which like numerals indicate like parts.

FIG. 7A is a cross-sectional view of an exemplary backlight having prismatic extraction elements spaced apart by a spacing a.

FIG. 9 is a partial cross-sectional view, parallel to the xy plane, of selected components of a backlight having a cutout configured to enhance spatial distribution of light into a light guide.

FIG. 10 schematically illustrates a nonuniform light guide having a hollow interior portion.

DETAILED DESCRIPTION OF CERTAIN PREFERRED EMBODIMENTS

Figure 1:
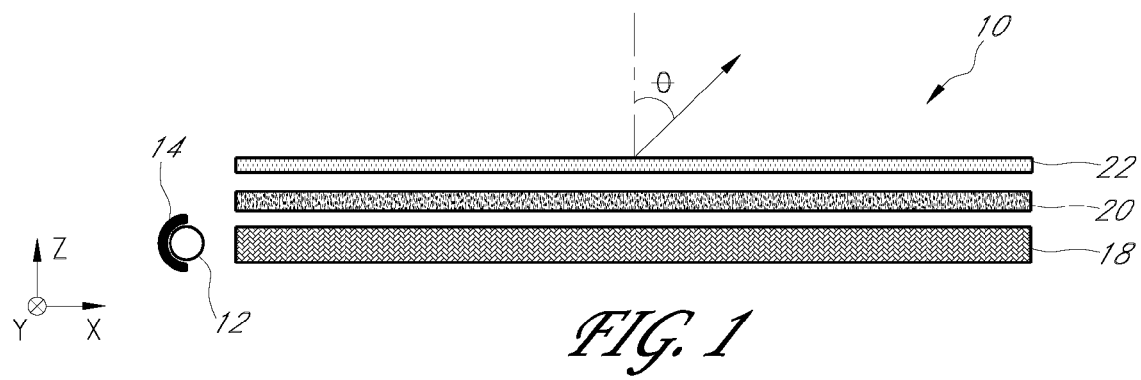
FIG. 1 schematically illustrates selected components of an exemplary backlight.

An example backlight 10 is illustrated in FIG. 1. The backlight 10 includes a light source 12, such as one or more fluorescent lamps, incandescent lamps, cold cathode fluorescent lamps, light emitting diodes, or laser diodes. In other embodiments, other types of light sources are used, or a combination of different types of light sources are used. In certain embodiments, the backlight 10 includes a light source that is configured to generate multi-chromatic light (for example, white light), while in other embodiments the backlight 10 includes a light source that is capable of generating substantially monochromatic light at one or more selected wavelengths. One example of such a light source is an array of red, green and blue light emitting diodes (an "RGB LED array"). In the example embodiment illustrated in FIG. 1, the light source 12 is a linear light source positioned along at least a portion of a selected edge of the backlight 10 to provide edge lighting. In certain modified embodiments, the light source 12 is positioned along more than one edge of the backlight. In other embodiments, the light source is positioned elsewhere.

Still referring to FIG. 1, the backlight 10 further includes a planar, optically transmissive light guide 18 that is configured to receive and propagate light generated by the light source 12. In an example embodiment, the light guide has a rectangular shape, although other shapes are used in other embodiments, such as circles, ovals, and asymmetrical or irregular shapes. Depending on the type of light source used, an optional elongate concave reflector 14 is optionally positioned on the opposite side of the light source 12 from the light guide 18. In such embodiments, the concave reflector 14 is used to increase the amount of light coupled from the light source 12 into the light guide 18. Other systems for coupling light from the light source 12 into the light guide 18 are used in other embodiments. For example, in an embodiment wherein the light source 12 comprises an array of light emitting diodes, light piping or a fiber optic coupling system can be used to couple light from the light source 12 into the light guide 18. This configuration allows the light source 12 to be positioned remotely with respect to the light guide 18. Other configurations are used in other embodiments.

In an example embodiment, the light guide 18 comprises a material that is substantially optically transmissive to one or more wavelengths generated by the light source 12. In example embodiments, the light guide 18 comprises a material having a higher index of refraction than other materials surrounding the light guide, such that light is guided within the light guide 18 by total internal reflection. Examples of optically transmissive materials that typically comprise the light guide 18 include, but are not limited to, glass, plastic or a polymer. In a modified embodiment, the light guide 18 is replaced by a light box having the light source 12 positioned therein.

Figure 2:
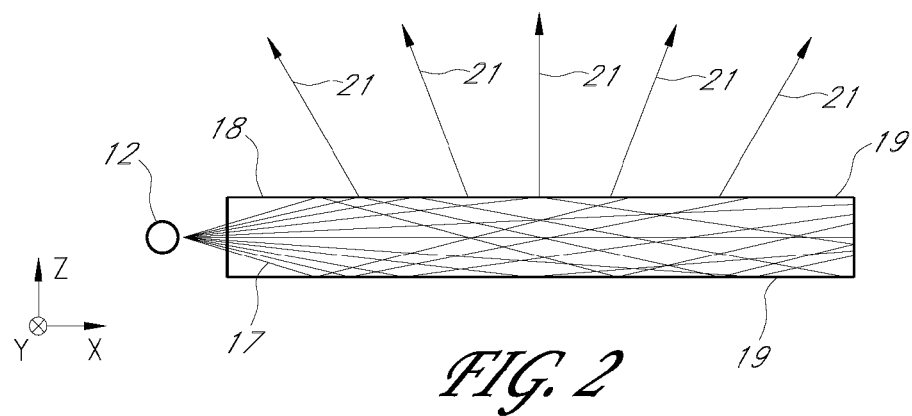
FIG. 2 is a cross-sectional view, parallel to the xz plane, of the light guide of FIG. 1.

The light guide 18 includes a plurality of extraction elements that are used to direct light out of the light guide 18. For example, FIG. 2 illustrates a cross-sectional view of the light guide 18 of FIG. 1 taken parallel to the xz plane. The light guide 18 includes a plurality of extraction elements (not shown) on one or both of the planar surfaces 19. Thus, light propagating within the light guide 18 propagates generally as illustrated by ray traces 17, while light coupled from the light guide 18 via the extraction elements propagates, for example, as illustrated by arrows 21. Thus, this configuration enables the light guide 18 to function as a planar light source.

As used herein, the term "extraction element" is used broadly, and in addition to its ordinary meaning, it refers generally to a feature used to cause light to be coupled out of the light guide 18 through one or more planar surfaces 19. For example, in one embodiment a region of increased surface roughness on the planar light guide 18. In another embodiment, an ordered, random, or pseudo-random array of raised features (such as a pattern of protrusions or dimples) or recessed features (such as a pattern of ridges or grooves) functions as extraction elements. In still other embodiments, localized material differences or other surface and/or volume perturbations function as extraction elements. In one example, the extraction elements comprise paint dots. In certain embodiments the extraction elements are evenly distributed over a planar surface of the light guide 18. However, in other embodiments the extraction elements are distributed nonuniformly, or are positioned on only a portion of a planar surface of the light guide 18, thereby providing a technique for spatially manipulating light extraction from a light guide. Furthermore, in certain embodiments one or more characteristics of one or more of the extraction elements is spatially modulated, thereby providing yet another parameter for spatially manipulating light extraction from a light guide. Examples of such characteristics include, but are not limited to, feature dimension (for example, height or lateral dimension) and feature density, although other characteristics are modified in other embodiments, depending on the type of extraction element used.

In an example embodiment, the extraction elements are applied to the light guide 18 using a painting technique, such as by applying paint spots to a surface of the light guide 18 although other application techniques are used in other embodiments, such as layering, coating or molding, roughening, etching. The extraction elements are configured to refract, reflect, diffract, and/or scatter light propagating within the light guide 18. While certain example configurations of the extraction elements are described here, the methods for manipulating light extraction from a light guide disclosed herein are not limited to certain types or configurations of extraction elements, and thus these methods are equally applicable to other types of extraction elements not disclosed herein, including future developed extraction elements.

Figure 3:
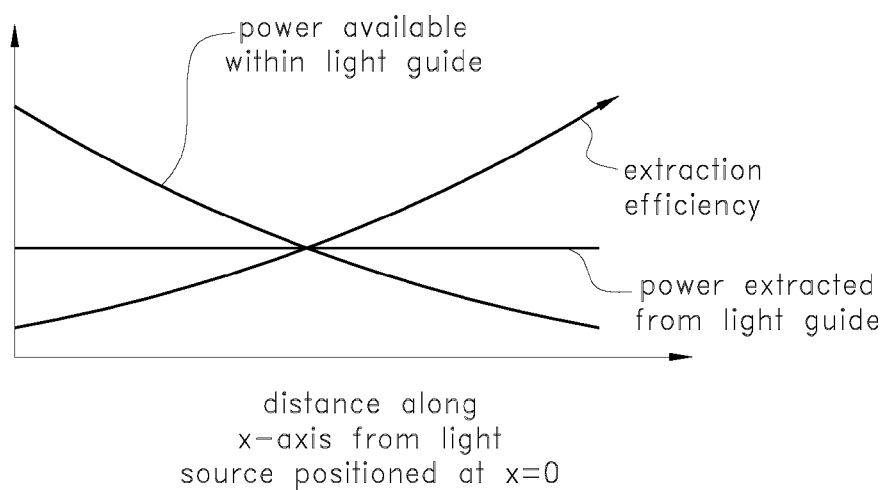
FIG. 3 is a conceptual plot of available power within the light guide, extraction efficiency across the light guide, and power extracted from the light guide, all as a function of distance from a light source at one end of the light guide.

The arrangement of the extractor elements may vary with different designs. For example, FIG. 3 is a conceptual plot of available power within the light guide, extraction efficiency, and power extracted from the light guide, all as a function of distance from the light source. FIG. 3 presents an optimized case wherein the power extracted from the light guide is independent of the distance from the light source. FIG. 3 indicates that more power is available within the light guide in a region closer to the light source, but that the extraction elements are configured to extract light from the light guide relatively inefficiently in this region. On the other hand, less power is available within the light guide in a region further from the light source, but the extraction elements are configured to extract light from the light guide relatively efficiently in this region. This combined result is a level of power extracted from the light guide that is independent of the distance from the light source.

Referring again to FIG. 1, in certain embodiments an optional planar diffuser 20 is positioned over or forward of the light guide 18, such that light coupled from the extraction elements passes through the planar diffuser 20. The planar diffuser 20 is configured to diffuse light. For example, in certain embodiments the diffuser comprises surface or volume features that symmetrically or asymmetrically scatter light passing therethrough. In such embodiments, the scattering may be substantially random from location to location across the diffuser 20. This diffusing effect at least partially reduces the appearance of the light extractors in the illumination field extracted from the light guide. In one embodiment, the planar diffuser 20 is an optically transmissive element having a surface feature variation capable of randomly redirecting light in a wide range of angles, such as up to ±90° with respect to the incident angle. The planar diffuser 20 is optional, and is omitted from the backlight 10 in certain embodiments.

In certain embodiments, an optional planar light recycling film 22 is positioned over or forward of the light guide 18. In embodiments wherein a diffuser 20 is used to scatter light coupled out of the light guide 18, the light recycling film 22 may be positioned over or forward the diffuser 20, as illustrated in FIG. 1. The light recycling film 22 is used to adjust the angular distribution of light extracted from the light guide 18. In particular, the light recycling film 22 is configured to transmit light into a substantially limited range of angles ±θ, as illustrated in FIG. 1. The light recycling film 22 permits a reduced amount of the light transmitted therethrough to be directed outside the range of angles ±θ. In general, the light recycling film 22 is designed such that light is back reflected toward the light guide 18, rather than be transmitted outside the range of angles ±θ.

Figure 4:
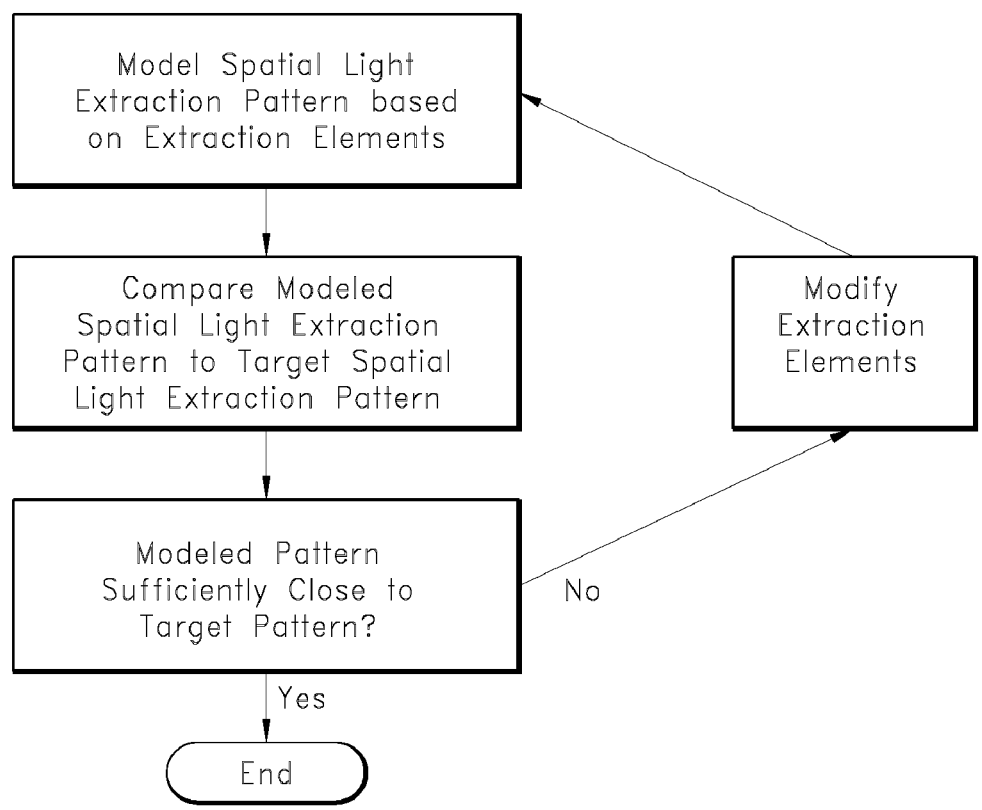
FIG. 4 is a flowchart illustrating an example process for iteratively adjusting an extraction element characteristic to obtain a target spatial pattern of light extracted from the light guide.

In certain embodiments, an iterative feedback process is used to adjust one or more characteristics of extraction elements on a light guide, thereby allowing the spatial pattern of light extracted from the light guide to be manipulated. In some embodiments, such a feedback process is used to produce a uniform spatial light pattern, while in other embodiments, such a feedback process is used to produce a spatial light pattern with a predefined, nonuniform spatial variation (such as a Gaussian distribution). In either case, a target spatial light pattern is defined and a spatial light pattern is estimated, for example, by using a computer simulation of the operation of a configuration of extraction elements. In other embodiments, the spatial light pattern is estimated by measuring a spatial light pattern generated by a prototype. Based on the spatial light extraction pattern determined by simulation, one or more characteristics of the extraction elements are iteratively modified such that, after a certain number of iterations, the actual light extraction pattern produced by the modified extraction elements approximates the target light extraction pattern. Generally, the iterative adjustment process involves reducing extraction efficiency in regions where the amount of light extracted from the light guide is to be reduced, and increasing extraction efficiency in regions where the amount of light extracted from the light guide is to be increased. This iterative process is generally illustrated in the flowchart of FIG. 4.

A characteristic of an extraction element at an arbitrary position (x, y) on the surface of the light guide is generally referred to herein as T(x, y). Example characteristics of an extraction element include, but are not limited to, the shape of an extraction element, the size of an extraction element, the spacing between extraction elements, the extraction efficiency of an extraction element and/or another property that affects how the extraction element couples light from the light guide. For example, in an embodiment wherein the extraction elements comprise regions of the light guide coated with a paint that alters the propagation of light within the light guide, the characteristic T(x, y) represents the portion of an area centered at (x, y) that is coated with the paint. Thus, in an embodiment wherein identical extraction elements are uniformly spaced over the entire surface of the light guide, T(x, y) is constant for all (x, y).

Optionally, the function T(x, y) is normalized, such that T(x, y)=1 for an extraction element having the maximum extraction efficiency for a given extraction element characteristic. For example, in an embodiment wherein the extraction elements comprise regions of the light guide coated with a paint that alters the propagation of light within the light guide, the normalized characteristic T(x, y)=1 for an area centered at (x, y) that is completely covered with paint.

In an example embodiment, the target spatial light pattern, also referred to as the "output distribution" pattern, is defined by target illuminance or luminance values at various points over the surface of the light guide, although other measures of light output are used in other embodiments. The function E(x, y) generally represents the illuminance for an area centered at position (x, y) in a spatial light pattern. $E_T(x, y)$ represents the illuminance for an area centered at position (x, y) in a target spatial light pattern. For example, in an embodiment wherein light is to be uniformly extracted across the surface of the light guide, $E_T(x, y)$ is constant for all (x, y). The illuminance at a given point E(x, y) is correlated with the extraction element characteristic T(x, y) at that point. Thus, in an example embodiment, the illuminance at a given point E(x, y) is adjusted by manipulating the characteristic T(x, y) at that point.

In certain modified embodiments, an imaging system is used to image the output of the light guide. Thus, in such embodiments, the illuminance E(x, y) is mapped to an imaged spatial light pattern with a corresponding distribution E'(x, y), which is then used to modify the characteristic T(x, y) of the extraction elements.

Figure 5A:
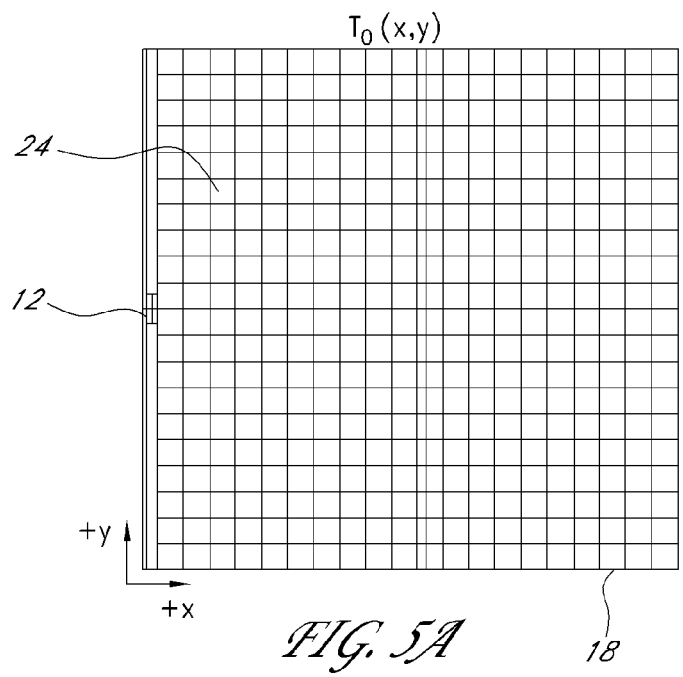
FIG. 5A schematically illustrates a field of extraction elements positioned over the surface of a light guide, wherein the extraction elements have a characteristic $T_0(x, y)$ that is uniform over the entire surface of the light guide.
Figure 6A:
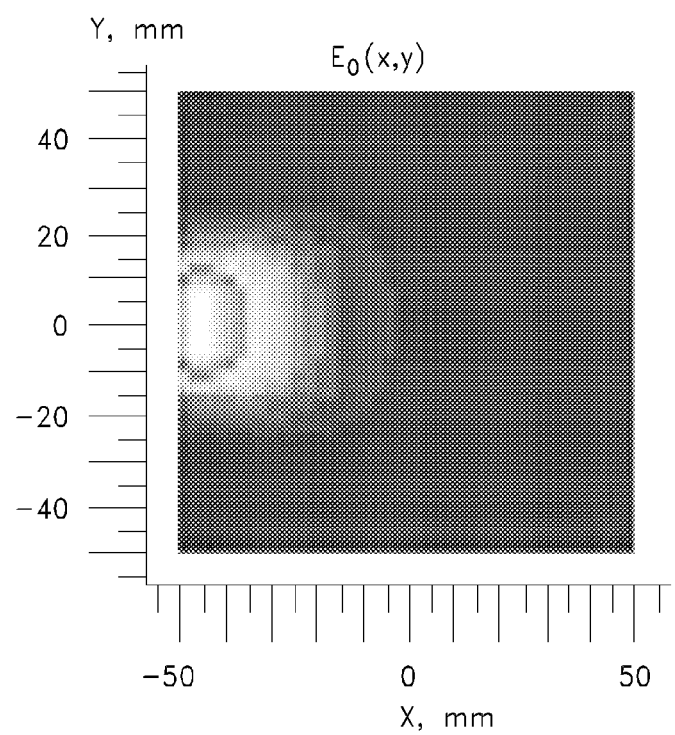
FIG. 6A is a plot of a spatial illuminance field $E_0(x, y)$ generated when light is extracted from the field of extraction elements illustrated in FIG. 5A.

The following describes an example process for iteratively adjusting the extraction element characteristic T(x, y) to generate a spatial light pattern that estimates the target spatial light pattern, as defined by $E_T(x, y)$. In this example, the target spatial light pattern is a uniform illumination field across the surface of the light guide, and thus $E_T(x, y)$ is constant for all (x, y). This example iterative feedback process is initiated by modeling a uniform field of identical extraction elements that are evenly spaced over the entire surface of the light guide, such that $T_0(x, y)$ is constant for all (x, y). An example of such a uniform field of extraction elements 24 is illustrated in FIG. 5A, which also illustrates the position of the light source 12. The illuminance of the resulting initial spatial light pattern $E_0(x, y)$ is modeled using a ray tracing technique to produce a spatial illuminance distribution, as illustrated in FIG. 6A. The characteristics of the extraction elements are then adjusted to produce a first iteration field of extraction elements $T_1(x, y)$, where $$T_1(x, y) = \kappa_0 T_0(x, y) \left(\frac{E_T(x, y)}{E_0(x, y)}\right)^\alpha,$$

where $$\kappa_0 = \frac{\max(T_0(x, y))}{\max\left(T_0(x, y)\left(\frac{E_T(x, y)}{E_0(x, y)}\right)^\alpha\right)}.$$

Figure 5B:
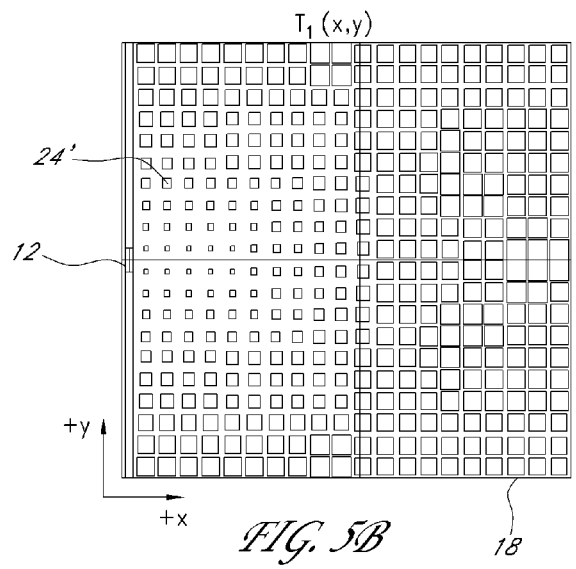
FIG. 5B schematically illustrates a field of extraction elements positioned over the surface of a light guide, wherein the extraction elements have a modified characteristic $T_1(x, y)$.
Figure 6B:
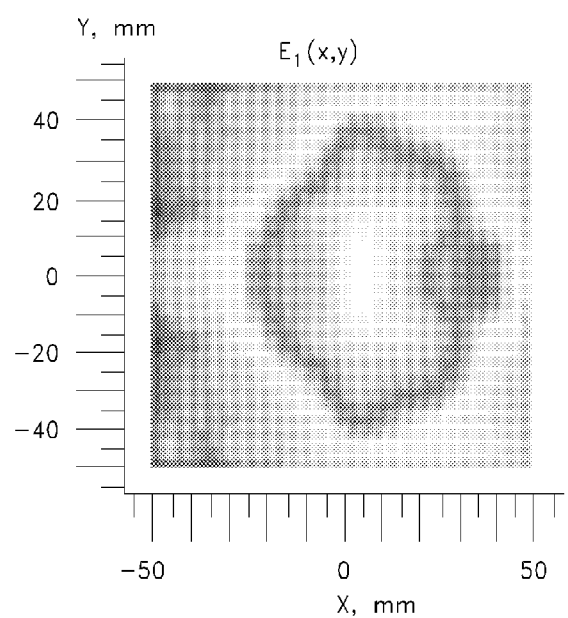
FIG. 6B is a plot of a spatial illuminance field $E_1(x, y)$ generated when light is extracted from the field of extraction elements illustrated in FIG. 5B.
Figure 5C:
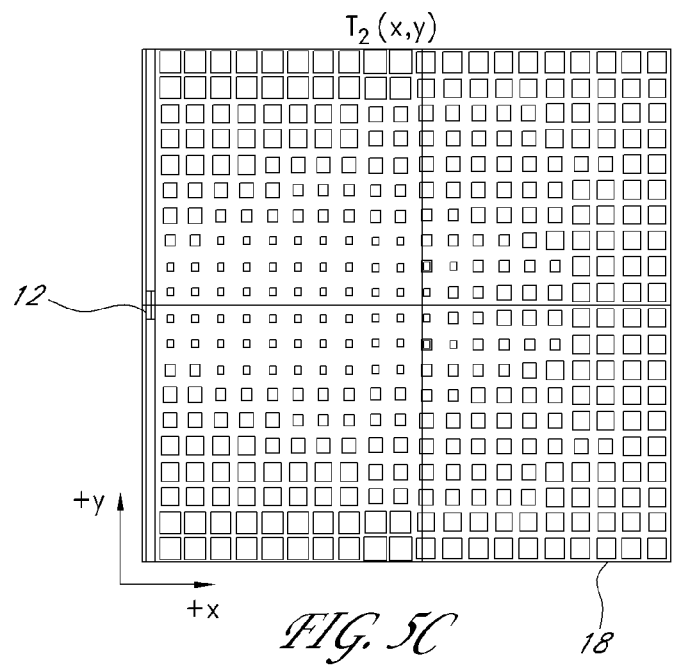
FIG. 5C schematically illustrates a field of extraction elements positioned over the surface of a light guide, wherein the extraction elements have a modified characteristic $T_2(x, y)$.
Figure 6C:
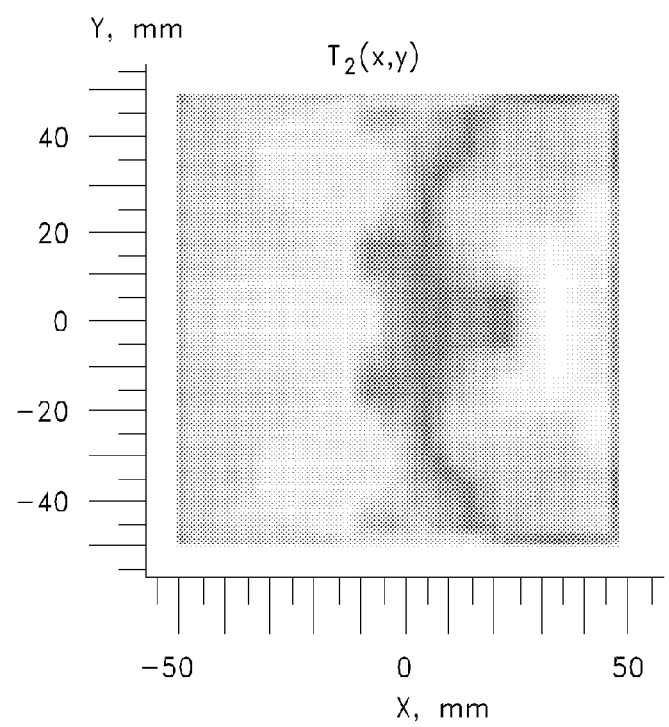
FIG. 6C is a plot of a spatial illuminance field $E_2(x, y)$ generated when light is extracted from the field of extraction elements illustrated in FIG. 5C.
Figure 5D:
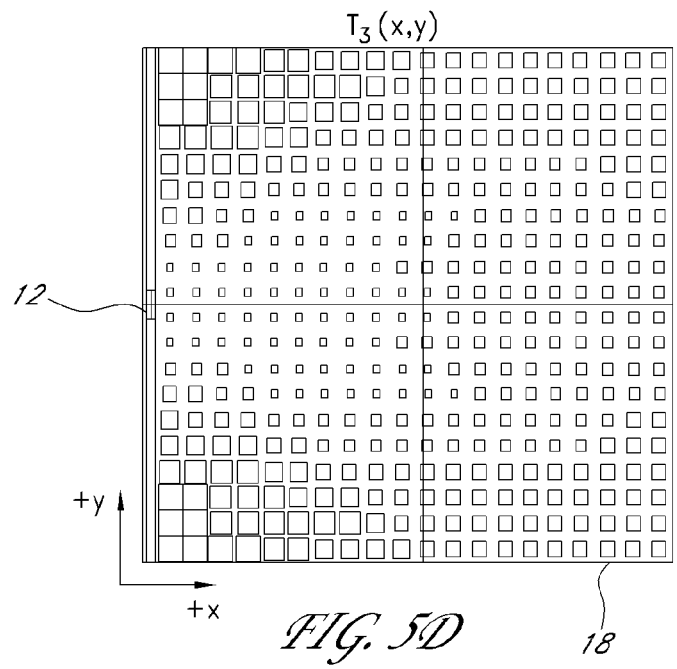
FIG. 5D schematically illustrates a field of extraction elements positioned over the surface of a light guide, wherein the extraction elements have a modified characteristic $T_3(x, y)$.
Figure 6D:
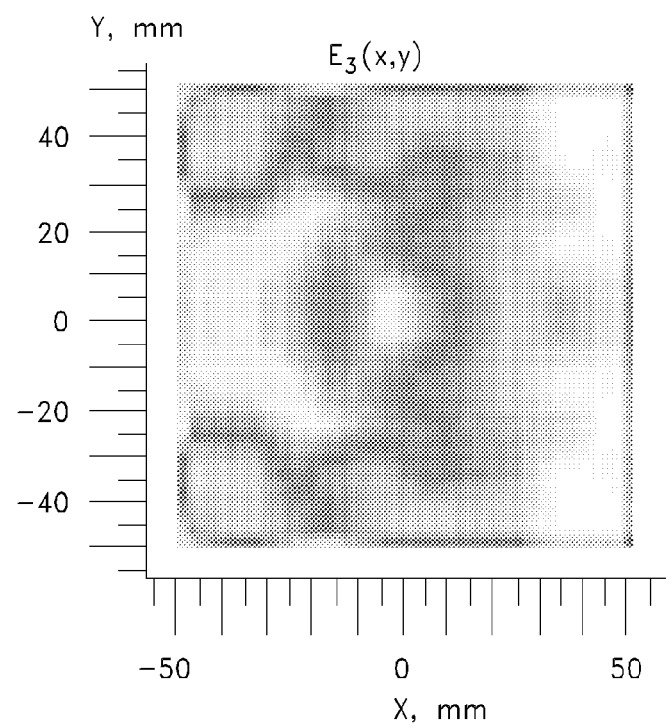
FIG. 6D is a plot of a spatial illuminance field $E_3(x, y)$ generated when light is extracted from the field of extraction elements illustrated in FIG. 5D.
Figure 5E:
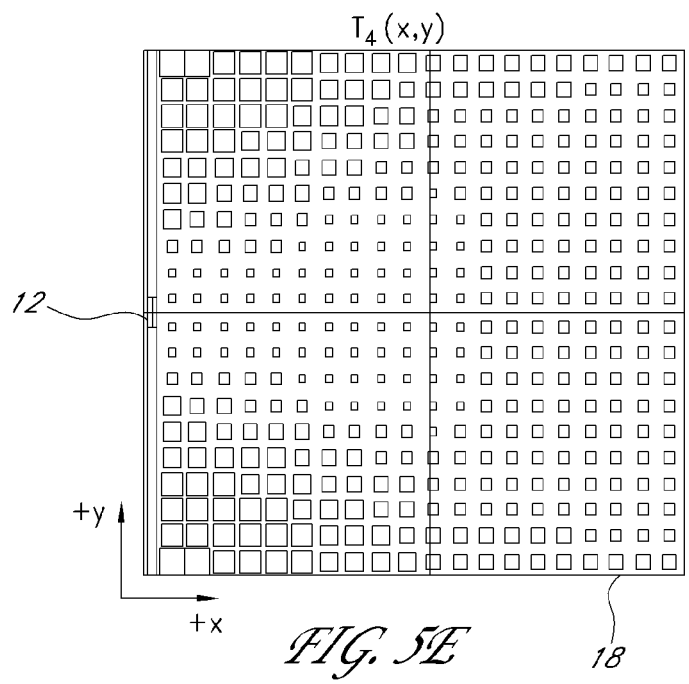
FIG. 5E schematically illustrates a field of extraction elements positioned over the surface of a light guide, wherein the extraction elements have a modified characteristic $T_4(x, y)$.
Figure 6E:
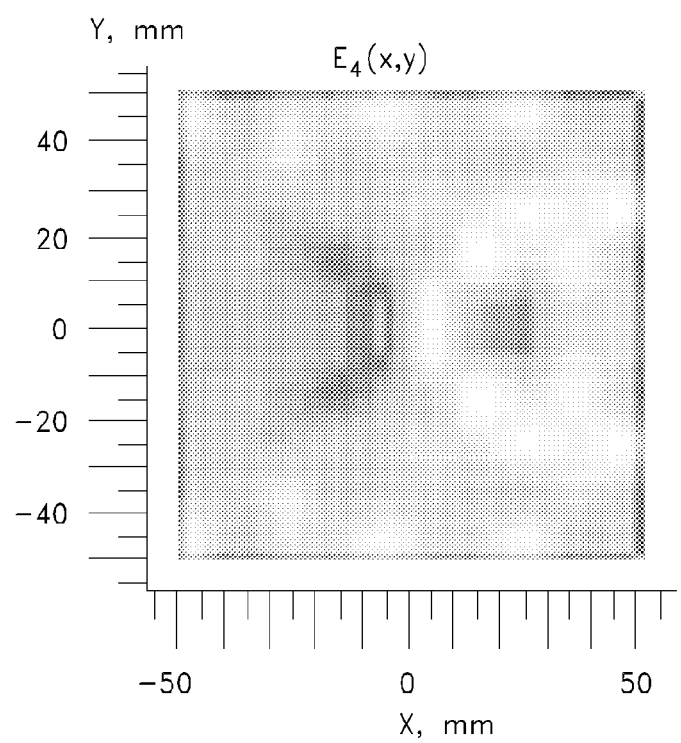
FIG. 6E is a plot of a spatial illuminance field $E_4(x, y)$ generated when light is extracted from the field of extraction elements illustrated in FIG. 5E.
Figure 5F:
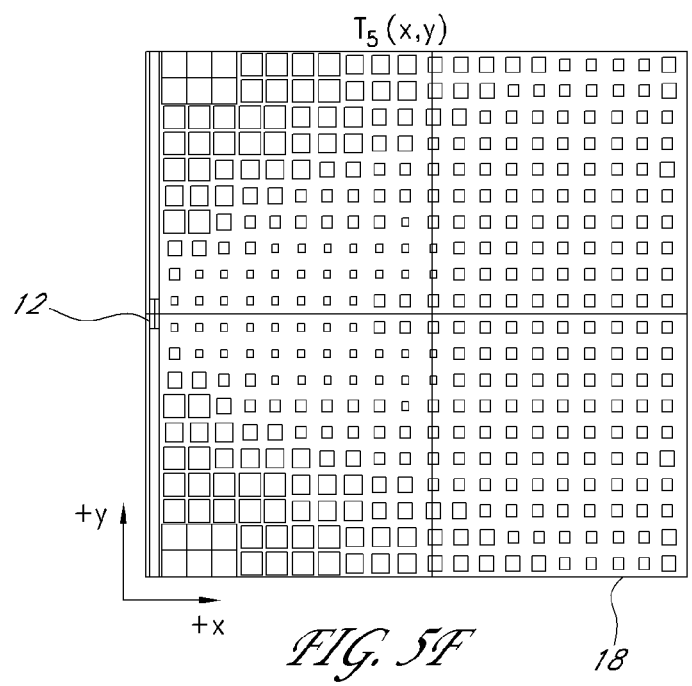
FIG. 5F schematically illustrates a field of extraction elements positioned over the surface of a light guide, wherein the extraction elements have a modified characteristic $T_5(x, y)$.
Figure 6F:
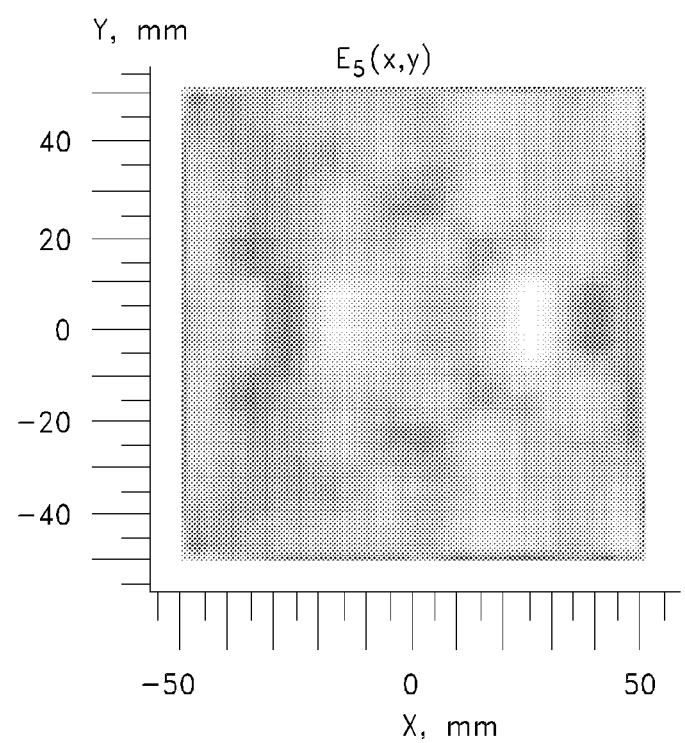
FIG. 6F is a plot of a spatial illuminance field $E_5(x, y)$ generated when light is extracted from the field of extraction elements illustrated in FIG. 5F.

As used herein, α is a damping coefficient that is included to attenuate the destabilizing affects of noise and to improve convergence to $E_T(x, y)$. In an example embodiment, α<1. The scaling constant $\kappa_0$ is included to set the maximum value of $T_1(x, y)$ to be substantially equal to the maximum value of $T_0(x, y)$, which helps to increase the efficiency of the system. The first iteration field of extraction elements, defined by $T_1(x, y)$, is illustrated in FIG. 5B. As illustrated, the field of extraction elements defined by $T_1(x, y)$ includes smaller extraction elements 24' positioned in regions where less light is to be extracted from the light guide. The resulting light extraction pattern associated with $T_1(x, y)$, represented by $E_1(x, y)$, is illustrated in FIG. 6B, and has a more uniform spatial distribution than the initial spatial light pattern $E_0(x, y)$ illustrated in FIG. 6A.

The process of calculating a new extraction element field $T_i(x, y)$ based on the previous extraction element field $T_{i-1}(x, y)$ and the ratio of the target light extraction pattern $E_T(x, y)$ to the previous light extraction pattern $E_{i-1}(x, y)$ is repeated. The general expression for calculating the ith extraction element field $T_i(x, y)$ is $$T_i(x, y) = \kappa_{i-1} T_{i-1}(x, y) \left(\frac{E_T(x, y)}{E_{i-1}(x, y)}\right)^\alpha,$$

-continued
where $$\kappa_{i-1} = \frac{\max(T_{i-1}(x, y))}{\max\left(T_{i-1}(x, y)\left(\frac{E_T(x, y)}{E_{i-1}(x, y)}\right)^\alpha\right)}.$$

The scaling constant κ is included to maintain the efficiency of the system. In particular, this definition of κ preserves high light extraction efficiency in regions of the light guide with low optical energy, as illustrated conceptually in FIG. 3. While this calculation of $T_i(x, y)$ is based on the ratio of the target light extraction pattern $E_T(x, y)$ to the previous light extraction pattern $E_{i-1}(x, y)$, in other embodiments a different type of comparison between the target light extraction pattern $E_T(x, y)$ and the previous light extraction pattern $E_{i-1}(x, y)$ is used.

Optionally, in situations where $E_{i-1}(x, y)$ at a certain point is less than 5% of the average $E_{i-1}(x, y)$ for the light guide, $E_{i-1}(x, y)$ is set at 5% of the average $E_{i-1}(x, y)$ instead. This advantageously avoids a numerically unstable situation wherein the ratio of $E_T(x, y)$ to $E_{i-1}(x, y)$ approaches infinity. In some embodiments, $T_0(x, y)$ is not constant for all (x, y). For example, in a modified embodiment, $T_0(x, y)=0$ at for points (x, y) wherein $E_T(x, y)=0$. In such embodiments, this helps to speed convergence of $E_i(x, y)$ to $E_T(x, y)$. However, in applications where $E_T(x, y) \neq 0$ for all (x, y), a constant $T_0(x, y)$ is optionally provided for all (x, y).

Continuation of this iterative approach, FIGS. 5C, 5D, 5E, and 5F illustrate the second, third, fourth and fifth iterations of the extraction element fields, respectively, based on the initial uniform field an light source illustrated in FIG. 5A. Likewise, FIGS. 6C, 6D, 6E, and 6F illustrate the spatial light patterns associated with the second, third, fourth and fifth iterations of the extraction element fields, respectively. These figures illustrate that with subsequent iterations, the resulting spatial light pattern converges to the target light extraction pattern $E_T(x, y)$, which is a field of uniform illuminance across the surface of the light guide.

As described herein, the damping coefficient α is included to attenuate the destabilizing affects of noise and to improve convergence of the iteratively-produced spatial light pattern to the target spatial light pattern $E_T(x, y)$. Example ranges for the coefficient α include α<1, α≦0.9, α≦0.8, α≦0.7, α≦0.6, α≦0.5, α≦0.4, α≦0.3, α≦0.2, and α≦0.1. In certain embodiments, 0.25≦α≦0.80, in other embodiments 0.30≦α≦0.75, and in still other embodiments, 0.35≦α≦0.70. Still other values for the coefficient α are used in other embodiments. Another technique that is optionally used to reduced the time to convergence of the iteratively-produced spatial light extraction pattern to the target spatial light pattern $E_T(x, y)$ is to increase the area over which the illuminance is estimated and correspondingly reduce the number of points (x, y) over which the illuminance is estimated. T(x, y) between the sampled values of (x, y) is then computed using, for example, an interpolation algorithm.

In an example embodiment, the number of iterations i used to converge on the target light extraction pattern $E_T(x, y)$ is determined by measuring the error between the light extraction pattern $E_i(x, y)$ obtained on the ith iteration, and the target light extraction pattern $E_T(x, y)$. Once this error falls below a predetermined threshold, for example, a "noise floor" as described more fully below, no further iterations are performed. In certain embodiments, the threshold is selected based on the degree to which the target light extraction pattern is to be replicated for a particular application.

The illuminance of the light extraction pattern $E_i(x, y)$ may be modeled based on the array of extractor elements characterized by $T_i(x, y)$ by simulating rays of light through the light guide. Both speed and accuracy of this simulation can be adjusted by selecting an appropriate number of rays. In an example embodiment, a reduced number of rays is traced beginning with the 1st iteration and continuing through the nth iteration, and an increased number of rays is traced beginning with the (n+1)th iteration and continuing through the ith iteration. Optionally, the number of rays is increased when the rate of convergence to $E_T(x, y)$ decreases below a predetermined threshold value. Generally, increasing the number of rays traced will advantageously reduce the noise in the calculation, but will also disadvantageously increase computation time required to estimate the light extraction pattern $E_i(x, y)$.

Optionally, the illuminance of the light extraction pattern $E_i(x, y)$ is smoothed or spatially averaged during one or more of the iterations, for example using a low-pass filter. Performing such an averaging step advantageously removes noise from the system, and therefore helps the iterative process converge to the target spatial light extraction pattern $E_T(x, y)$ using fewer iterations.

Figure 7A:
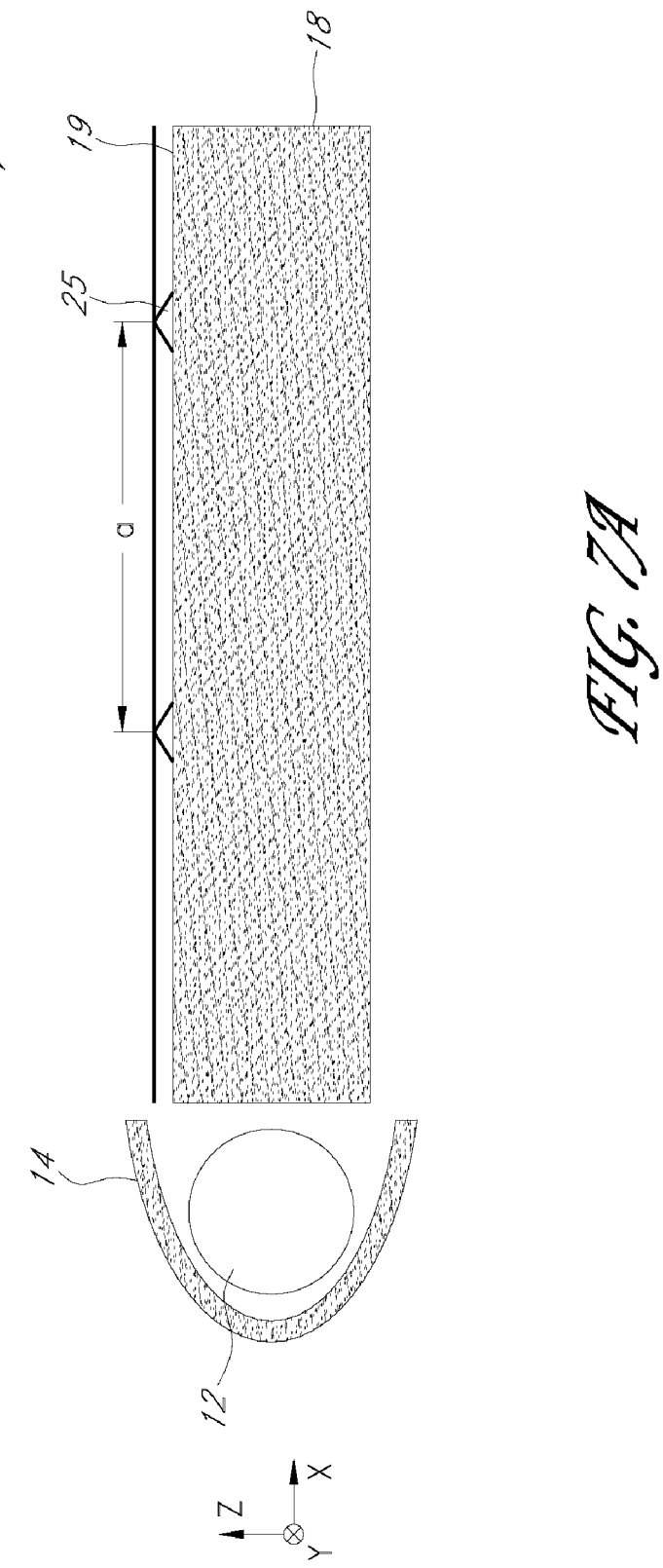
Figure 7B:
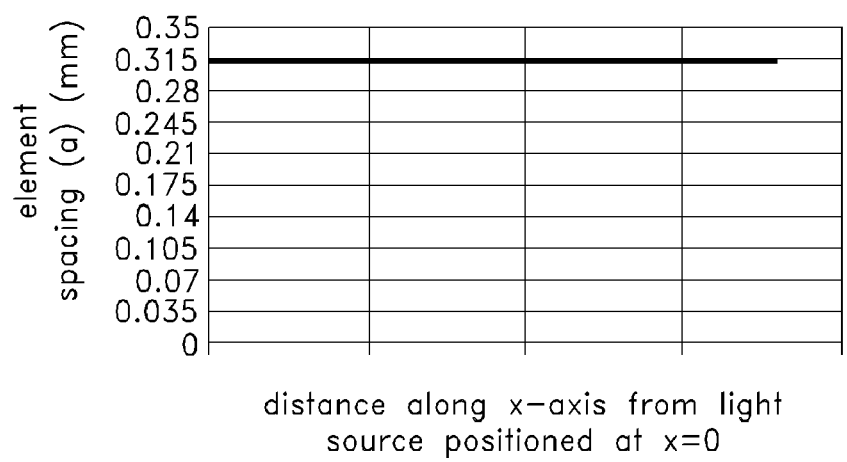
FIG. 7B is a plot of extraction element spacing a as a function of position for the backlight of FIG. 7A, wherein the element spacing a is constant.
Figure 7C:
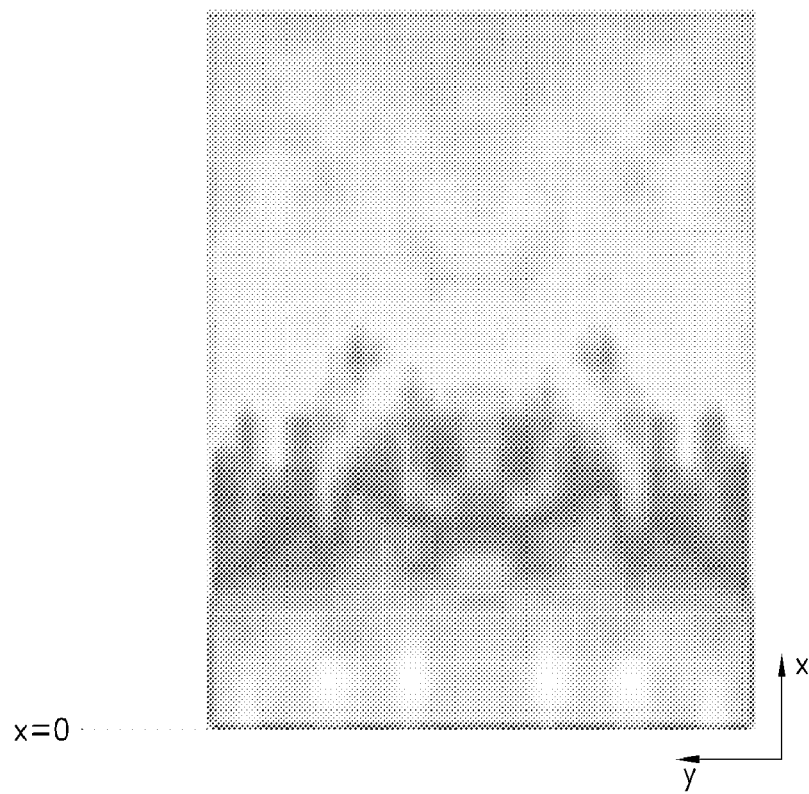
FIG. 7C is a plot of a spatial illuminance field generated when light is extracted from a backlight having the extraction element spacing plotted in FIG. 7B.
Figure 7D:
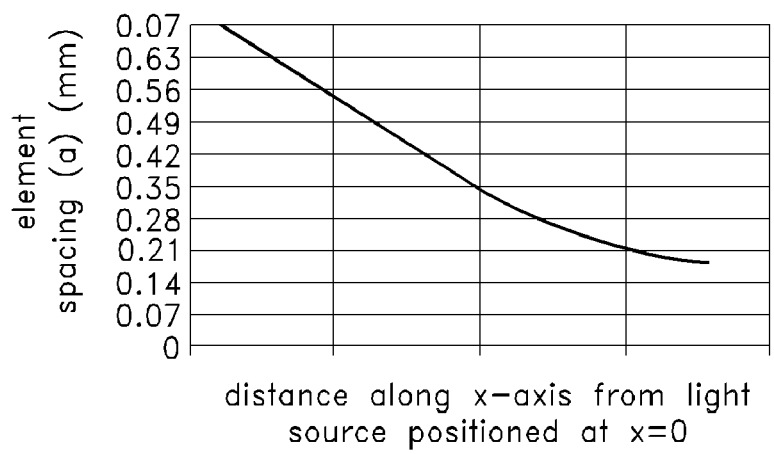
FIG. 7D is a plot of extraction element spacing a as a function of position for the backlight of FIG. 7A, wherein the element spacing a is progressively decreases.
Figure 7E:
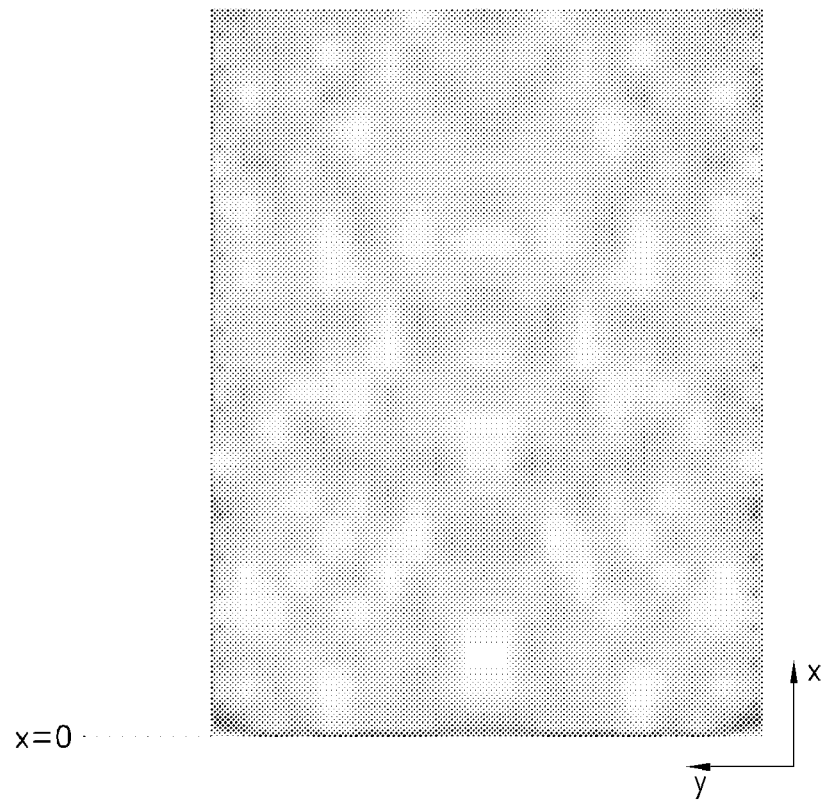
FIG. 7E is a plot of a spatial illuminance field generated when light is extracted from a backlight having the extraction element spacing plotted in FIG. 7D.

In certain embodiments, the extraction element characteristic $T(x, y)$ refers to the physical spacing of individual extraction elements on the surface of the light guide. For example, FIG. 7A illustrates a schematic cross-sectional view of a exemplary backlight 10 including a linear light source 12, such as a cold cathode fluorescent lamp, and a planar light guide 18. A plurality of prismatic extraction elements 25 are positioned on a planar surface 19 of the light guide 18, the prismatic extractor elements being spaced apart from each other by a spacing a. The spacing a illustrated in FIG. 7A is exaggerated for purposes of clarity. As illustrated in FIGS. 7B and 7C, in an embodiment wherein the element spacing a is constant across the surface of the light guide 18, substantial nonuniformity is apparent in the resulting spatial light extraction pattern, with more light being extracted closer to the light source 12 positioned at x=0. However, as illustrated in FIGS. 7D and 7E, in an embodiment wherein the element spacing a varies and, for example, decreases as a function of distance from the light source 12, it is possible to generate a substantially more spatially uniform light extraction pattern. Specifically, by increasing the spacing a of the prismatic extraction elements in a region proximal to the light source 12, less light is extracted in the proximal region, and by decreasing the spacing a of the prismatic extraction elements in a region distal to the light source 12, more light is extracted in the distal region.

In certain embodiments, the spacing a as a function of distance from the light source 12, as illustrated in FIG. 7D, is iteratively determined using the methods disclosed herein. In such embodiments, relative spacing between adjacent extraction elements is inversely related to the extraction efficiency. Equations such as described above can be used wherein $\alpha<0$, (for example, $-1<\alpha<0$). Optionally, in cases where adjacent extraction elements are moved close enough together such that overlap would occur, then the total number of extraction elements can be reduced.

Figure 8A:
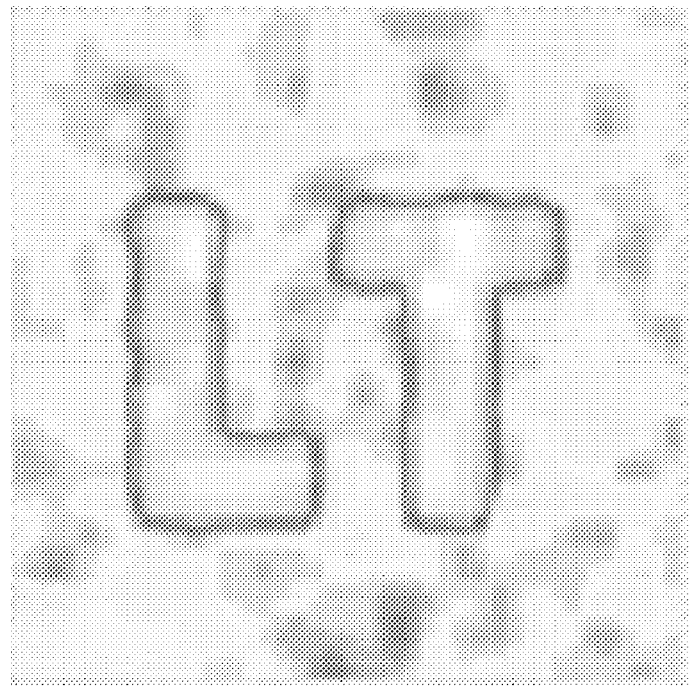
FIG. 8A is a plot of a nonuniform target spatial illuminance field.
Figure 8B:
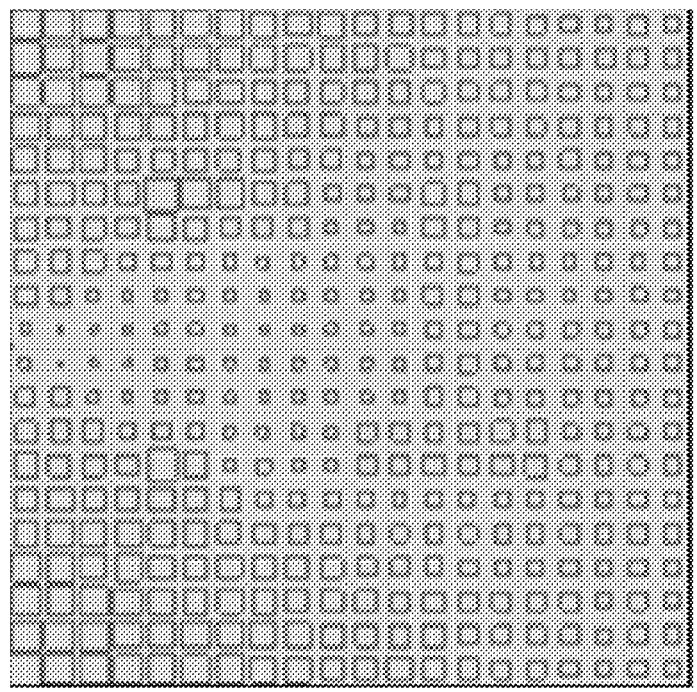
FIG. 8B schematically illustrates a field of extraction elements capable of generating the spatial illuminance field of FIG. 8A.

As described herein, in certain embodiments the target spatial illuminance pattern is uniform, such that $E_T(x, y)$ is constant for all $(x, y)$. However, in other embodiments the target spatial illuminance pattern is nonuniform, such as in a Gaussian distribution or an arbitrarily-shaped distribution. For example, FIG. 8A illustrates an arbitrarily-shaped target spatial illuminance pattern having an image of the letters LT displayed with an illuminance that is approximately twice as large as a background illuminance. The iterative techniques disclosed herein are used to characterize an array of extraction elements capable of producing this spatial illuminance pattern, which is used to define $E_T(x, y)$. For example, FIG. 8B illustrates an exemplary array of extraction elements characterized by performing eight iterations of the calculations disclosed herein; this array is capable of generating the spatial illuminance pattern of FIG. 8A.

While iterative processes for manipulating an array of extraction elements are disclosed herein, in other embodiments other characteristics of the backlight are manipulated and tested. In such embodiments, the iterative process is repeated one or more times after manipulating the other characteristics of the backlight, optionally adjusting the other characteristic after each iteration. Examples of such other characteristics that are manipulated include, but are not limited to, thickness of the light guide, shape of the light guide, type of the light source, technique for coupling light from the light source into the light guide, position and orientation of the light source, and properties of subsequent optical elements, such as diffusers and light recycling films. For instance, as shown in the example embodiment illustrated in FIG. 9, coupling of light from the light source 12 into the light guide 18 is enhanced by forming a cutout 26 in the light guide 18 in a region adjacent to the light source 12. This configuration is particularly useful for providing enhanced distribution of light into the light guide 18 in embodiments wherein the light source 12 is relatively small compared to the light guide 18, such as in embodiments wherein the light source comprises a light emitting diode or a laser diode.

In certain embodiments, the light guide has a nonuniform shape and/or includes open interior portions. For example, FIG. 10 illustrates a nonuniform light guide 40 having an open interior portion 42. As described herein, $E_T(x, y)$ represents the illuminance for an area centered at position $(x, y)$ in a target spatial light pattern. When defining $E_T(x, y)$ for the nonuniform light guide 40, the $E_T(x, y)$ value for certain of the areas centered at position $(x, y)$ are smaller than other areas. For example, FIG. 10 illustrates a plurality of areas 44 centered at position $(x, y)$. Certain of these areas, such as areas 46, fully overlap the light guide, and thus $E_T(x, y)$ for such areas 46 is uniform (assuming that the light guide 40 has a uniform illuminance). However, other areas, such as area 46', only partially overlap the light guide, and thus $E_T(x, y)$ for such areas will be reduced.

SCOPE OF THE INVENTION

While the foregoing detailed description discloses several embodiments of the present invention, it should be understood that this disclosure is illustrative only and is not limiting of the present invention. It should be appreciated that the specific configurations and operations disclosed can differ from those described above, and that the methods described herein can be used in contexts other than extraction of light from light guides.

I claim:

1. A method of defining an array of extractor elements configured to extract light from a light guide, thereby producing a desired spatial light pattern $E_T$ quantifying optical output at a plurality of locations across the light guide, the method comprising:

(a) calculating a first spatial light pattern produced by a first array of extractor elements, the first spatial light pattern quantifying optical output at the plurality of locations across the light guide;
(b) determining a ratio R of the optical output of the desired spatial light pattern to an optical output of the first spatial light pattern;
(c) determining a modified ratio R', wherein $R'=R^\alpha$ and $|\alpha|<1$; and
(d) determining a characteristic of a second array of extractor elements by scaling a characteristic of the first array of extractor elements by the modified ratio R'.

2. The method of claim 1, wherein the first spatial light pattern quantifies illuminance at the plurality of locations across the light guide.

3. The method of claim 1, wherein the first spatial light pattern quantifies luminance at the plurality of locations across the light guide.

4. The method of claim 1, wherein the extractor elements comprise paint dots, prisms, roughened areas, dimples, diffractive elements, index of refraction variations, luminescent materials, or protrusions.

5. The method of claim 1, wherein the characteristic of the first and second arrays of extractor elements comprise a height, lateral dimension, density, transmissivity, scattering coefficient, angle, curvature, or reflectivity of the extractor element.

6. The method of claim 1, wherein $-1<\alpha<0$.

7. The method of claim 1, wherein $0<\alpha<1$.

8. The method of claim 1, wherein $0.30 \leq |\alpha| \leq 0.75$.

9. The method of claim 1, wherein the light guide comprises a rectangular plate of substantially optically transmissive material.

10. The method of claim 1, wherein the light guide has an irregular shape.

11. The method of claim 10, wherein the light guide has an irregularly shaped outer perimeter.

12. The method of claim 10, wherein the light guide has an open interior portion.

13. The method of claim 1, wherein the desired spatial light pattern $E_T$ substantially varies across the light guide.

14. The method of claim 13, wherein the desired spatial light pattern $E_T$ forms an alphanumeric character.

15. The method of claim 1, further comprising:
(e) calculating a second spatial light pattern produced by the second array of extractor elements, the second spatial light pattern quantifying optical output at the plurality of locations across the light guide;
(f) determining a ratio R of the optical output of the desired spatial light pattern to an optical output of the second spatial light pattern;
(g) determining a modified ratio R', wherein $R'=R^\alpha$ and $|\alpha|<1$; and
(h) determining a characteristic of a third array of extractor elements by scaling a characteristic of the second array of extractor elements by the modified ratio R'.

16. The method of claim 1, further comprising iteratively selecting a parameter value by:
(1) modifying the parameter value from an initial value to a second value;
(2) calculating a second spatial light pattern produced by the second array of extractor elements, the second spatial light pattern quantifying optical output at the plurality of locations across the light guide;
(3) determining a ratio R of the optical output of the desired spatial light pattern to an optical output of the second spatial light pattern;
(4) determining a modified ratio R', wherein $R'=R^\alpha$ and $|\alpha|<1$; and
(5) determining a characteristic of a third array of extractor elements by scaling a characteristic of the second array of extractor elements by the modified ratio R';
(6) comparing the first spatial light pattern to the second spatial light pattern to assess the effect of the parameter value on spatial light pattern.

17. The method of claim 1, further comprising:
(e) determining a maximum of the characteristic of the first array of extractor elements;
(f) determining a maximum of the characteristic of the second array of extractor elements; and
(g) scaling the characteristic of the second array of extractor elements such that the maximum of the characteristic of the first array of extractor elements equals the maximum of the characteristic of the second array of extractor elements.

18. The method of claim 1, wherein the first spatial light pattern is calculated using a computer simulation.

19. The method of claim 1, further comprising
(e) calculating a second spatial light pattern produced by the second array of extractor elements, the second spatial light pattern quantifying optical output at the plurality of locations across the light guide;
(f) determining a ratio R of the optical output of the desired spatial light pattern to an optical output of the second spatial light pattern;
(g) determining a modified ratio R', wherein $R'=R^\alpha$ and $|\alpha|<1$; and
(h) determining a characteristic of a third array of extractor elements by scaling a characteristic of the second array of extractor elements by the modified ratio R';
wherein:
the first spatial light pattern is calculated by simulating a first number of rays;
the second spatial light pattern is calculated by simulating a second number of rays; and
the second number of rays is greater than the first number of rays.

20. The method of claim 1, wherein the first spatial light patterns that results from said first array of extractor elements is measured using a physical model of said light guide having said first array of extractor elements.

21. The method of claim 1, further comprising:
(e) calculating a second spatial light pattern produced by the second array of extractor elements, the second spatial light pattern quantifying optical output at the plurality of locations across the light guide;
(f) determining a ratio R of the optical output of the desired spatial light pattern to an optical output of the second spatial light pattern;
(g) determining a modified ratio R', wherein $R'=R^\alpha$ and $|\alpha|<1$; and
(h) determining a characteristic of a third array of extractor elements by scaling a characteristic of the second array of extractor elements by the modified ratio R';
(i) determining a noise level in the second spatial light pattern; and
(j) comparing a change between the second spatial light pattern and the desired spatial light pattern with the noise level.

22. The method of claim 21, further comprising:
(k) calculating a third spatial light pattern produced by the third array of extractor elements, the third spatial light pattern quantifying optical output at the plurality of locations across the light guide;

(l) determining a ratio R of the optical output of the desired spatial light pattern to an optical output of the third spatial light pattern;

(m) determining a modified ratio R', wherein $R'=R^\alpha$ and $|\alpha|<1$; and (n) determining a characteristic of a fourth array of extractor elements by scaling a characteristic of the third array of extractor elements by the modified ratio R';

wherein the third spatial light pattern is calculated by simulating a larger number of rays than used to calculate the second spatial light pattern.

23. The method of claim 21, wherein the comparison is used to determine that the second spatial light pattern is sufficiently close to the desired spatial light pattern $E_T$ so as to determine whether to calculate a third spatial light pattern.

24. The method of claim 1, further comprising low-pass filtering the first spatial light pattern.

25. The method of claim 24, wherein low-pass filtering comprises averaging the optical output across a plurality of areas of the light guide to smooth the first spatial light pattern.

26. The method of claim 1, wherein the desired spatial light pattern, $E_T(x, y)$ comprises an array of values for a corresponding array of areas superimposed on the light guide.

27. The method of claim 26, wherein at least a portion of the light guide only partially overlaps a selected area, the $E_T(x, y)$ value for the selected area being estimated based on the amount of overlap between the light guide and the selected area.

* * * * *